(12) United States Patent
Okamoto et al.

(10) Patent No.: US 8,081,874 B2
(45) Date of Patent: Dec. 20, 2011

(54) INTERCHANGEABLE LENS AND CAMERA BODY

(75) Inventors: Mitsuyoshi Okamoto, Osaka (JP); Koji Shibuno, Osaka (JP); Koji Hashigami, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/721,666

(22) Filed: Mar. 11, 2010

(65) Prior Publication Data

US 2010/0232779 A1  Sep. 16, 2010

Related U.S. Application Data

(60) Provisional application No. 61/160,010, filed on Mar. 13, 2009.

(30) Foreign Application Priority Data

Apr. 23, 2009 (JP) .................................. 2009-104996

(51) Int. Cl.
*G03B 7/085* (2006.01)

(52) U.S. Cl. ........................................ 396/257; 348/363

(58) Field of Classification Search .................. 396/257; 348/363

See application file for complete search history.

(56) References Cited

U.S. PATENT DOCUMENTS

| | | | |
|---|---|---|---|
| 5,128,769 A * | 7/1992 | Arai et al. ..................... 348/363 |
| 5,140,358 A | 8/1992 | Tokunaga et al. |
| 5,331,366 A | 7/1994 | Tokunaga et al. |
| 6,683,652 B1 * | 1/2004 | Ohkawara et al. ............ 348/347 |
| 2007/0104474 A1 | 5/2007 | Tamura |
| 2008/0030593 A1 * | 2/2008 | Sato .......................... 348/220.1 |
| 2008/0100730 A1 * | 5/2008 | Tsuda .......................... 348/262 |
| 2008/0198479 A1 | 8/2008 | Saito |
| 2008/0199176 A1 * | 8/2008 | Kurosawa ..................... 396/505 |
| 2009/0190910 A1 | 7/2009 | Yasuda et al. |
| 2009/0268038 A1 | 10/2009 | Matsumoto |
| 2009/0284612 A1 * | 11/2009 | Abe et al. .................... 348/221.1 |

FOREIGN PATENT DOCUMENTS

| JP | 2-97926 | 4/1990 |
|---|---|---|
| JP | 3-179879 | 8/1991 |
| JP | 11-112865 | 4/1999 |
| JP | 11-225954 | 8/1999 |
| JP | 2006-145667 | 6/2006 |

* cited by examiner

*Primary Examiner* — W. B. Perkey
*Assistant Examiner* — Linda B Smith
(74) *Attorney, Agent, or Firm* — Panasonic Patent Center; Dhiren Odedra; Kerry Culpepper

(57) ABSTRACT

An interchangeable lens which is mountable to a camera body and operates according to a command from the camera body includes a diaphragm operable to regulate an amount of light from a subject by changing an aperture, a drive unit operable to change the aperture of the diaphragm, and a lens controller operable to control the drive unit to change the aperture of the diaphragm according to an instruction received from the camera body. When the lens controller receives a new instruction from the camera body while changing the aperture of the diaphragm, the lens controller controls the drive unit to change the aperture of the diaphragm based on the new instruction without waiting for completion of the change of the aperture according to a previous instruction.

6 Claims, 6 Drawing Sheets

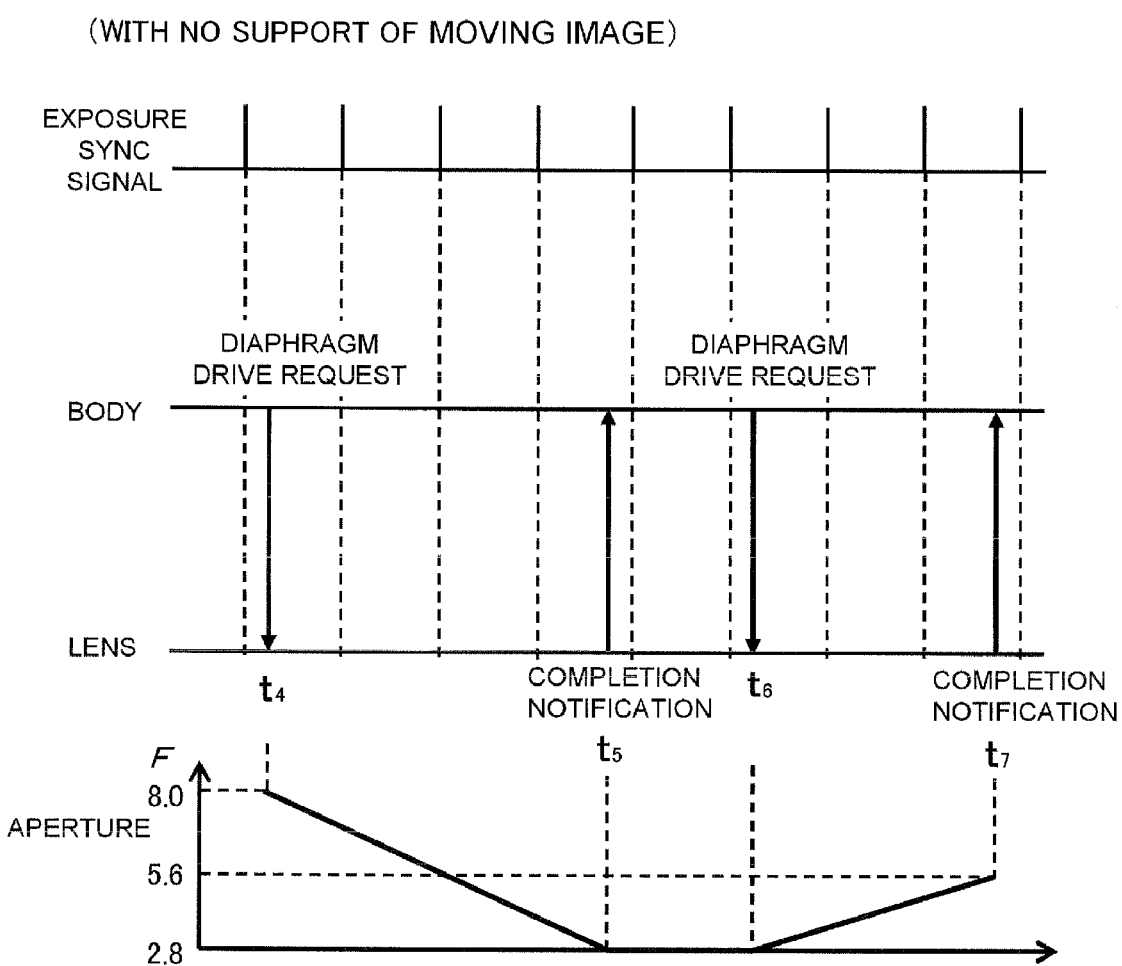

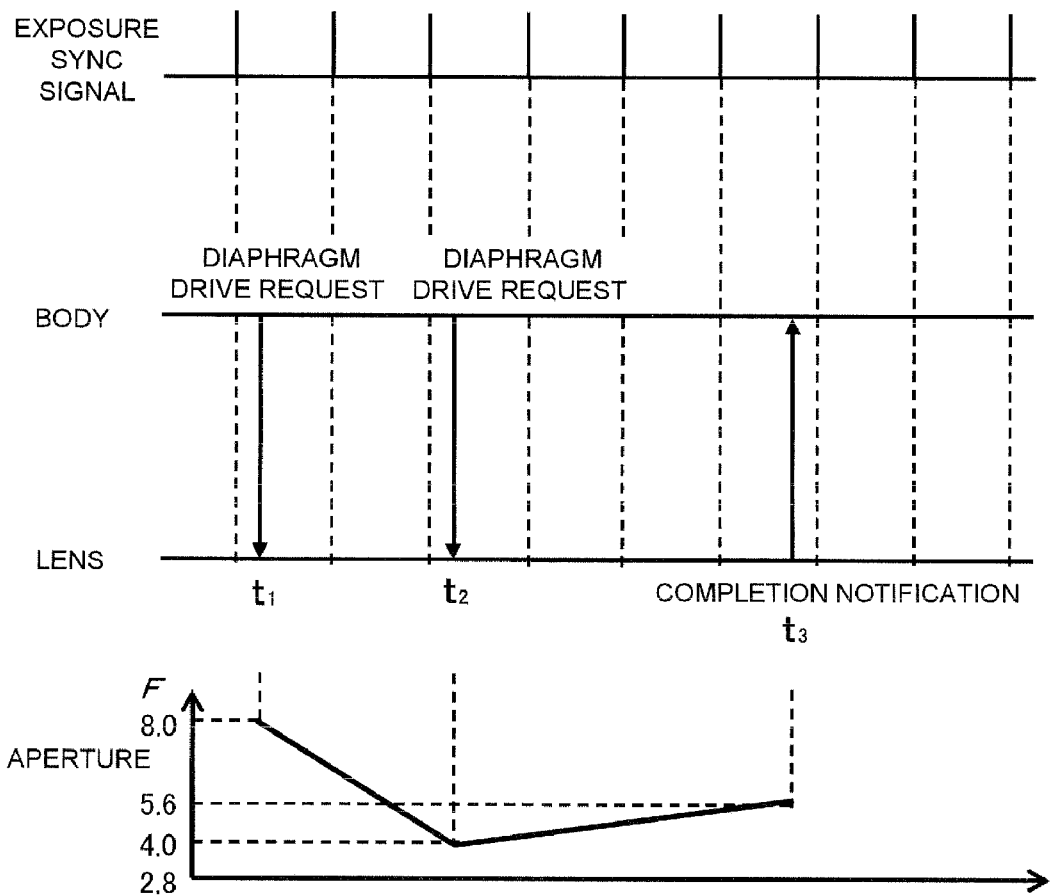

INTERCHANGEABLE LENS AND CAMERA BODY

BACKGROUND

1. Technical Field

The technical field relates to an interchangeable lens mountable to a camera body, and a camera body to which an interchangeable lens is mountable.

2. Related Art

Some electronic still cameras have a function of being able to display a moving image of a subject captured by an imaging device on a liquid crystal display (see, for example, JP11-112865A). In such an electronic still camera, when such a function is turned on, a moving image of a subject is displayed on a liquid crystal display.

In addition, in the electronic still camera, when a release button is not operated, exposure control is performed by controlling only an electronic shutter with a diaphragm means being fixed to a preset aperture value. On the other hand, when the release button is operated, exposure control is performed by controlling the diaphragm means to an appropriate aperture value and controlling the electronic shutter. By such control, in the electronic still camera, when a moving image of a subject is displayed, an unnatural brightness change due to the switching of the diaphragm is prevented and power consumption is reduced to a minimum, and upon recording a still image, an excellent image with no smear or the like can be recorded.

However, the electronic still camera disclosed in JP11-112865A is premised on the recording of still images and is not premised on the recording of moving images. That is, in the electronic still camera disclosed in JP11-112865A, exposure regulation is performed only by changing the shutter speed. Thus, when the brightness of the surroundings gets brighter than a predetermined level upon recording a moving image, the shutter speed is increased. Hence, in the electronic still camera disclosed in JP11-112865A, it is difficult to record a smooth moving image. In addition, conventionally, none of such interchangeable lens type cameras that drive a diaphragm of an interchangeable lens in response to a command from a camera body performs recording of a moving image.

SUMMARY

An object is to provide an interchangeable lens capable of recording smooth moving images, and a camera body to which such an interchangeable lens is mountable.

In order to solve the above described problem, an interchangeable lens mountable to a camera body and operating according to a command from the camera body is provided, which includes a diaphragm operable to regulate an amount of light from a subject by changing an aperture, a drive unit operable to change the aperture of the diaphragm, and a lens controller operable to control the drive unit to change the aperture of the diaphragm according to an instruction received from the camera body. When the lens controller receives a new instruction from the camera body during an operation of changing the aperture of the diaphragm, the lens controller controls the drive unit to change the aperture of the diaphragm based on the new instruction without waiting for completion of the operation of changing the aperture according to a previous instruction.

A camera body to which an interchangeable lens with a diaphragm is mountable is provided. The camera body includes an imaging unit operable to generate image data, an aperture value obtaining unit operable to obtain an aperture value of the diaphragm from the interchangeable lens, a moving image support information obtaining unit operable to obtain the moving image support information indicating whether or not the interchangeable lens is suitable for the moving image from the interchangeable lens, and a camera controller operable to control the camera body to change the aperture of the diaphragm according to the image data generated by the imaging unit, the aperture value obtained by the aperture value obtaining unit, and the moving image support information obtained by the moving image support information obtaining unit.

According to the above configurations, when the interchangeable lens accepts a new instruction from the camera body while changing the aperture of the diaphragm, the interchangeable lens changes the aperture of the diaphragm based on the new instruction without waiting for completion of the change of the aperture according to a previous instruction so that a smooth moving image can be shot.

BRIEF DESCRIPTION OF THE DRAWINGS

FIG. 5A is a sequence diagram of a diaphragm adjustment made by an interchangeable lens that does not support a moving image.

FIG. 5B is a sequence diagram of a diaphragm adjustment made by an interchangeable lens that supports a moving image.

DETAILED DESCRIPTION OF THE PREFERRED EMBODIMENTS

An embodiment will be described below with reference to the accompanying drawings.

1. Embodiment

1-1. Overview

Figure 1:
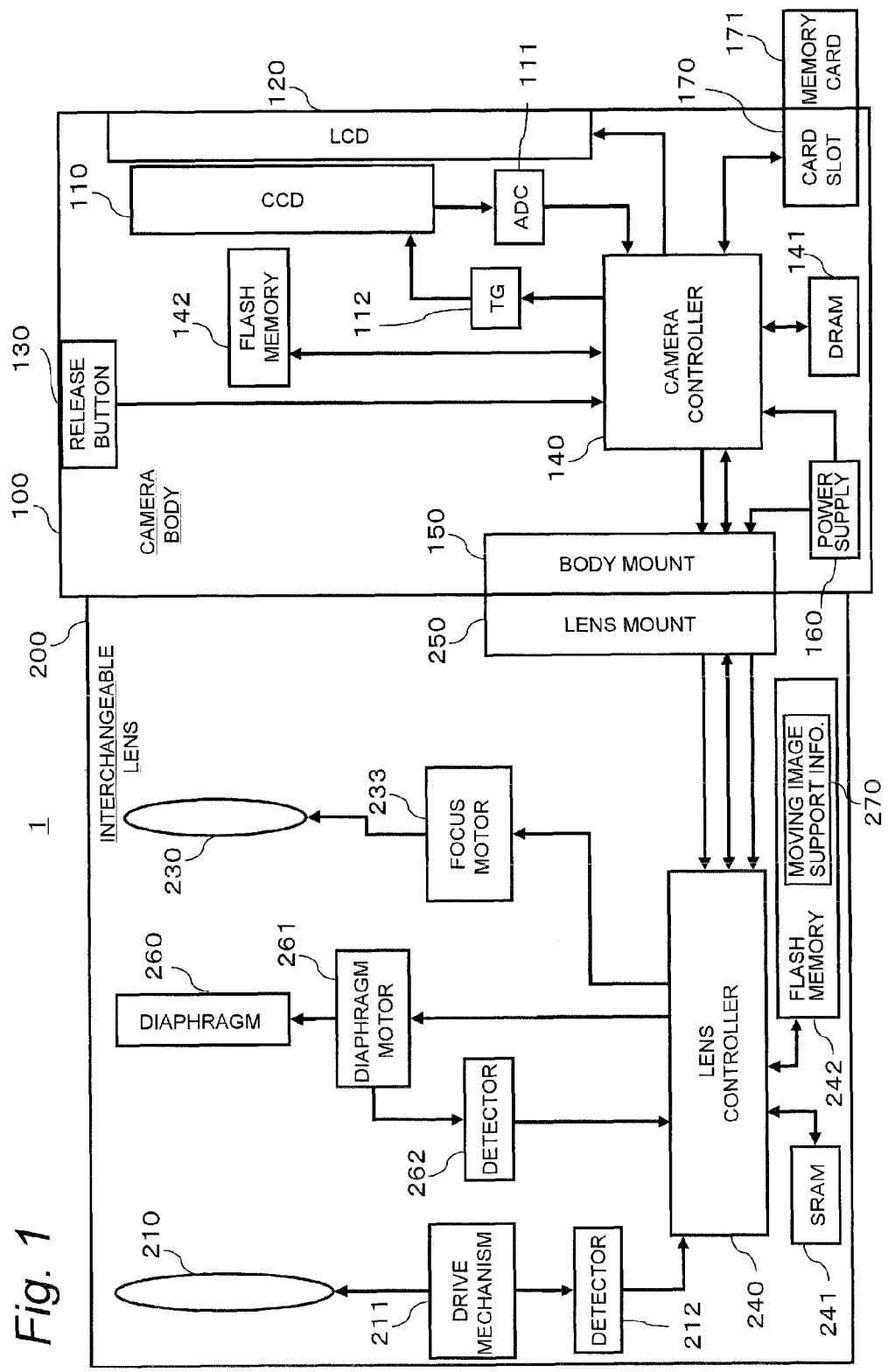
FIG. 1 is a block diagram showing a configuration of a camera system including an interchangeable lens and a camera body.

FIG. 1 shows a camera system according to the present embodiment. A camera system 1 includes a camera body 100 and an interchangeable lens 200. The interchangeable lens 200 has a diaphragm 260 for regulating an amount of light. The interchangeable lens 200 drives the diaphragm 260 according to an instruction received from the camera body 100. The interchangeable lens 200 according to the present embodiment is suitable for moving images. When the interchangeable lens 200 accepts a new instruction from the camera body 100 while changing the aperture of the diaphragm 260, the interchangeable lens 200 changes the aperture of the diaphragm 260 based on the new instruction without waiting for completion of the change of the aperture. By the camera system 1 according to the present embodiment that includes such an interchangeable lens 200 and the camera body 100 having such an interchangeable lens 200 attached thereto, control of the diaphragm 260 can be performed with flexibility and smooth moving images can be shot.

1-2. Configuration

1-2-1. Configuration of Camera Body

The camera body 100 mainly includes a CCD image sensor 110, a liquid crystal display (LCD) monitor 120, a camera controller 140, a body mount 150, a power supply 160, and a card slot 170.

The camera controller 140 is a controller that controls the entire camera system 1 (e.g., the CCD image sensor 110) according to an instruction from an operation member such as a release button 130. The camera controller 140 sends a vertical synchronizing signal to a timing generator 112. In addition, the camera controller 140 notifies the lens controller 240 of the interchangeable lens 200 of an exposure synchronizing signal in a cycle correlated with timing at which the vertical synchronizing signal is sent to the timing generator 112. The camera controller 140 uses a DRAM 141 as a work memory when performing a control operation or an image processing operation.

A flash memory 142 saves a program, parameters, and the like, which are used when the camera controller 140 performs control.

The CCD image sensor 110 is an imaging unit that captures a subject image incident thereon through the interchangeable lens 200 and thereby generates image data. An AD converter 111 digitizes the image data generated by the CCD image sensor 110. The camera controller 140 performs various image processing on the image data digitized by the AD converter 111. The various image processing specifically includes, for example, a gamma correction process, a white balance correction process, a flaw correction process, a YC conversion process, an electronic zoom process, and an image compression process such as a JPEG compression process.

The CCD image sensor 110 operates based on timing controlled by the timing operator 112. For example, the CCD image sensor 110 performs capturing of a still image, capturing of a moving image, and capturing of a through image, based on timing controlled by the timing generator 112. Here, the through image is an image that is not to be recorded in a memory card 171 after being captured. The through image is mainly a moving image and is displayed on the LCD monitor 120 to determine a composition when a still image is captured.

The LCD monitor 120 displays an image represented by display image data having been subjected to image processing by the camera controller 140. The LCD monitor 120 can selectively display a moving image and a still image.

The memory card 171 can be inserted into the card slot 170. The card slot 170 controls the memory card 171 based on control by the camera controller 140. The memory card 171 can store image data generated by image processing by the camera controller 140. For example, the memory card 171 can store JPEG image files. In addition, the memory card 171 can output image data or an image file stored therein. The image data or image file outputted from the memory card 171 is subjected to image processing by the camera controller 140. For example, the camera controller 140 decompresses image data or an image file obtained from the memory card 171 and thereby generates display image data.

The power supply 160 supplies power to be consumed by the camera system 1. The power supply 160 may be, for example, a dry-cell battery or a rechargeable battery. Alternatively, the power supply 160 may supply, to the camera system 1, power supplied from an external source through a power cord.

The body mount 150 can be mechanically and electrically connected to a lens mount 250 of the interchangeable lens 200. The body mount 150 can send and receive commands and data to/from the interchangeable lens 200 through the lens mount 250. The body mount 150 sends various control signals received from the camera controller 140 to a lens controller 240 through the lens mount 250. In addition, the body mount 150 supplies power received from the power supply 160 to the entire interchangeable lens 200 through the lens mount 250.

The body mount 150 according to the present embodiment configures an aperture value obtaining unit that obtains an aperture value of the diaphragm 260 from the interchangeable lens 200; a moving image support information obtaining unit that obtains, from the interchangeable lens 200, moving image support information 270 indicating whether or not the interchangeable lens 200 is suitable for a moving image; and a body notification unit that sends a control signal to the interchangeable lens 200. The camera controller 140 according to the present embodiment configures a controller that controls the camera system 1 to change the aperture of the diaphragm 260, according to image data generated by the CCD image sensor 110 and an aperture value and moving image support information 270 which are obtained by the body mount 150. The camera controller 140 according to the present embodiment includes a determination unit that determines whether or not to change the aperture of the diaphragm 260; and a generator that generates a control signal (drive request signal) for controlling the diaphragm 260.

1-2-2. Configuration of Interchangeable Lens

The interchangeable lens 200 mainly includes an optical system, the lens controller 240, and the lens mount 250. The optical system of the interchangeable lens 200 includes a zoom lens 210, an OIS lens (not shown), the diaphragm 260, and a focus lens 230.

The zoom lens 210 is a lens for changing the magnification of a subject image formed by the optical system of the interchangeable lens 200. The zoom lens 210 is configured by one or a plurality of lenses. A drive mechanism 211 includes a zoom ring operable by a user and the like, and informs the zoom lens 210 of an operation performed by the user to cause the zoom lens 210 to move in an optical axis direction of the optical system. A detector 212 detects an amount of drive of the drive mechanism 211. The lens controller 240 obtains a result of the detection performed by the detector 212 and can thereby grasp the zoom magnification of the optical system.

The diaphragm 260 is a member for regulating the amount of light passing through the optical system. The diaphragm 260 includes, for example, a plurality of diaphragm blades and can regulate the amount of light by opening and closing an opening fanned by the blades. A diaphragm motor 261 is a drive unit (changing unit) for opening and closing the opening of the diaphragm 260. A detector 262 detects an aperture of the diaphragm 260. The detector 262 can be implemented by, for example, an MR sensor.

The focus lens 230 is a lens for changing the focus state of a subject image formed on the CCD image sensor 110 by the optical system. The focus lens 230 is configured by one or a plurality of lenses. A focus motor 233 drives the focus lens 230 to move back and forth along the optical axis of the optical system, based on control by the lens controller 240. By this, the focus state of a subject image formed on the CCD image sensor 110 by the optical system can be changed. In the present embodiment, for the focus motor 233, a stepping motor is used. Note, however, that the present embodiment is not limited thereto. The focus motor 233 can be implemented by, for example, a servo motor or an ultrasonic motor.

The lens controller 240 is a controller that controls the entire interchangeable lens 200, based on control signals from the camera controller 140. In addition, the lens controller 240 receives a signal from the detector 212 or the like and sends the signal to the camera controller 140. The lens controller 240 performs sending and receiving with the camera controller 140 through the lens mount 250 and the body mount 150. The lens controller 240 uses an SRAM 241 as a work memory when performing control.

A flash memory 242 is a storage unit that saves a program, parameters, and the like, which are used when the lens controller 240 performs control. As one example of the present embodiment, the flash memory 242 stores moving image support information 270 indicating whether or not the interchangeable lens 200 is suitable for a moving image. The detail of the moving image support information 270 will be described later.

The lens mount 250 can be mechanically and electrically connected to the body mount 150 of the camera body 100. The lens mount 250 can send and receive commands and data to/from the camera body 100 through the body mount 150. The lens mount 250 sends various control signals received from the lens controller 240 to the camera controller 140 through the body mount 150.

1-2-3. Moving Image Support Information

Figure 2:
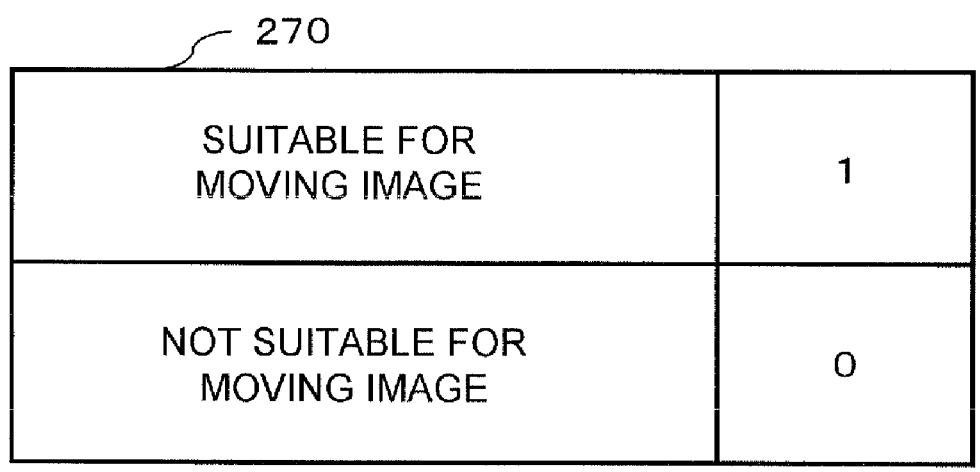
FIG. 2 is a diagram showing moving image support information.

Moving image support information 270 provided in the interchangeable lens 200 according to the present embodiment will be described. FIG. 2 shows moving image support information 270. The "moving image support information" is information indicating whether or not the interchangeable lens 200 is suitable for a moving image. For example, the "moving image support information" is information indicating whether or not the interchangeable lens 200 can perform control of the diaphragm 260 that is appropriate for recording of a moving image. In the present embodiment, as shown in FIG. 2, one-bit information is used as the moving image support information 270. The flag "1" indicates that the interchangeable lens is suitable for recording of a moving image, and the flag "0" indicates that the interchangeable lens is not suitable for recording of a moving image. That is, an interchangeable lens that is suitable for recording of a moving image stores "1" in a flash memory 242 as moving image support information 270. On the other hand, an interchangeable lens that is not suitable for recording of a moving image stores "0" in a flash memory 242 as moving image support information 270.

In the present embodiment, a determination as to whether or not an interchangeable lens is suitable for recording of a moving image (i.e., which one of the flags "1" and "0" is set) is made depending on whether or not a diaphragm 260 can be driven continuously (continuous drive condition). For example, such a determination is made depending on whether or not drive control of the diaphragm 260 can be performed based on a new drive instruction when the new diaphragm drive instruction is notified from the camera body 100 before diaphragm control based on a diaphragm drive instruction provided by the camera body 100 is completed.

For an interchangeable lens 200 that can perform drive control of a diaphragm 260 based on a new drive instruction even if control of the diaphragm 260 based on a previous drive instruction is not completed, flag "1" is set as an interchangeable lens suitable for recording of a moving image. When such an interchangeable lens 200 is attached to the camera body 100 and recording of a moving image is performed, even if the brightness of the surroundings is suddenly changed by pan recording and the like, the drive of the diaphragm 260 can be controlled with flexibility. Hence, a moving image with a smooth brightness change can be shot. Accordingly, the interchangeable lens 200 that can perform drive control of the diaphragm 260 based on a new drive instruction even if control of the diaphragm 260 based on a previous drive instruction is not completed is set as an interchangeable lens suitable for recording of a moving image.

On the other hand, for an interchangeable lens 200 that cannot perform drive control of a diaphragm 260 based on a new drive instruction when control of the diaphragm 260 based on a previous drive instruction is not completed, flag "0" is set as an interchangeable lens not suitable for recording of a moving image. When such an interchangeable lens 200 is attached to the camera body 100 and recording of a moving image is performed, if the brightness of the surroundings is suddenly changed by pan recording and the like, the drive of the diaphragm 260 cannot be controlled with flexibility. When the diaphragm 260 cannot be controlled with flexibility, the camera controller 140 needs to change the shutter speed to control exposure. However, when the brightness of the surroundings gets brighter than a predetermined level and thus the camera body 100 increases the shutter speed to a value higher than a predetermined value, a smooth moving image cannot be shot. Accordingly, the interchangeable lens that cannot drive the diaphragm 260 based on a new diaphragm drive instruction even when the new instruction is accepted before the drive of the diaphragm 260 is completed is set as an interchangeable lens not suitable for recording of a moving image.

In the present embodiment, the interchangeable lens 200 shown in FIG. 1 exemplifies a lens suitable for recording of a moving image, and thus, the flash memory 242 stores flag "1" as the moving image support information 270.

1-3. Recording Preparation Operation

Figure 3:
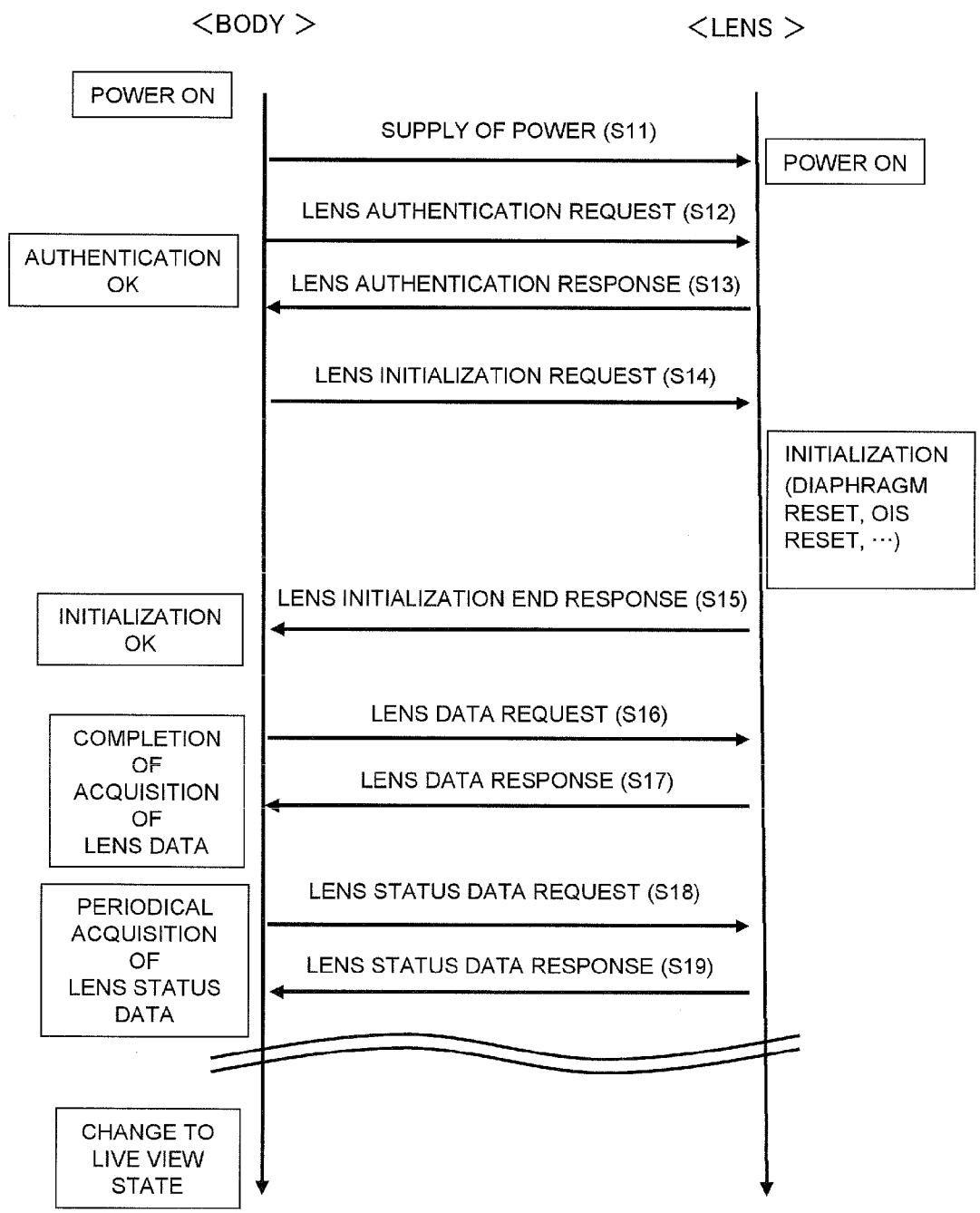
FIG. 3 is a sequence diagram showing a recording preparation operation.

The operation of the camera system 1 for recording preparation will be described. FIG. 3 shows a sequence of sending and receiving signals for a recording preparation operation of the camera system 1 according to the present embodiment. In a state of attaching the interchangeable lens 200 to the camera body 100, when the user turns on the power to the camera body 100, the power supply 160 supplies power to the interchangeable lens 200 through the body mount 150 and the lens mount 250 (S11). Then, the camera controller 140 requests authentication information of the interchangeable lens 200 from the lens controller 240 (S12). The "authentication information" of the interchangeable lens 200 includes information on whether or not the interchangeable lens 200 is attached and information on whether or not accessories are attached. The lens controller 240 responds to the lens authentication request from the camera controller 140 (S13).

The camera controller 140 requests the lens controller 240 to perform an initialization operation (S14). In response to this, the lens controller 240 performs an initialization operation, such as resetting of the diaphragm 260 and resetting of the OIS lens. Thereafter, the lens controller 240 sends the camera controller 140 a response indicating that the lens initialization operation has been completed (S15).

The camera controller 140 requests lens data from the lens controller 240 (S16). The lens data is stored in the flash memory 242 of the interchangeable lens 200. Hence, the lens controller 240 reads lens data from the flash memory 242 and sends the lens data to the camera controller 140 (S17). Here, the lens data includes, for example, characteristic values unique to the interchangeable lens 200 which include a lens name, F-number, a focal length, and moving image support information 270.

When the camera controller 140 grasps the lens data of the interchangeable lens 200 attached to the camera body 100, the camera system 1 goes into a recordable state.

When the camera system 1 goes into a recordable state, the camera controller 140 periodically requests lens status data indicating a state of the interchangeable lens 200 from the lens controller 240 (S18). The lens status data includes, for example, zoom magnification information by the zoom lens 210, position information of the focus lens 230, and aperture value information of the diaphragm 260. In response to this request, the lens controller 240 sends, as a response, the requested lens status data to the camera controller 140 (S19).

1-4. Recording Operation

Figure 4:
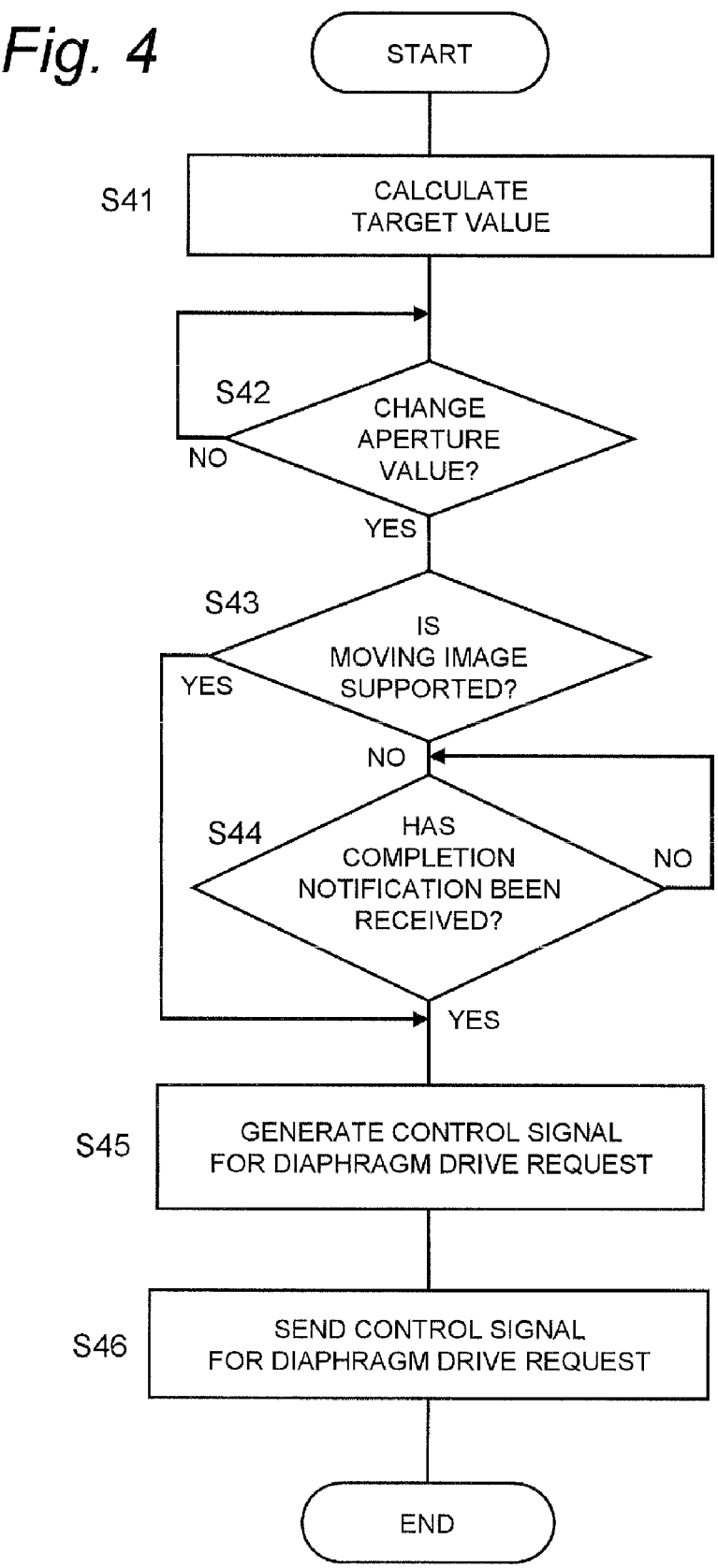
FIG. 4 is a flowchart showing a recording operation.

Next, a recording operation of the camera system 1 will be described using FIGS. 4, 5A, and 5B. When the camera system 1 goes into a recordable state, by the user operating an operation member such as the release button 130, the camera system 1 starts a recording operation. FIG. 4 shows a flow of control of the diaphragm 260 of the interchangeable lens 200 which is performed by the camera body 100 when a moving image is shot.

The camera controller 140 calculates a target aperture value based on brightness information of image data captured by the CCD image sensor 110 (S41). In addition, the camera controller 140 obtains information about an aperture value and a focal length from the lens controller 240 in a cycle correlated with a cycle of an exposure synchronizing signal. During recording of a moving image, the camera controller 140 determines whether or not the aperture value of the diaphragm 260 of the interchangeable lens 200 needs to be changed (S42). For example, the camera controller 140 determines whether or not a new target aperture value which is calculated from image data generated by the CCD image sensor 110 is different from an aperture value obtained from the lens controller 240.

If it is determined that the aperture value needs to be changed, then the camera controller 140 determines whether or not the attached interchangeable lens 200 is suitable for recording of a moving image, based on moving image support information 270 obtained from the interchangeable lens 200 at step S17 in FIG. 3 (S43). If the interchangeable lens 200 is suitable for recording of a moving image, then the camera controller 140 immediately notifies the interchangeable lens 200 of a diagram drive request which instructs the interchangeable lens 200 to drive the diaphragm 260. Specifically, the camera controller 140 generates a drive request signal which is a control signal for controlling the diaphragm 260 (S45) and sends the drive request signal to the interchangeable lens 200 (S46). On the other hand, if the interchangeable lens is not suitable for recording of a moving image, then it is determined whether or not the camera controller 140 has received a completion notification for a previous diaphragm drive request from the interchangeable lens (S44). If a completion notification for a previous diaphragm drive request has already been received, then the camera controller 140 generates a drive request signal which is a control signal for controlling the diaphragm 260 (S45) and sends the drive request signal to the interchangeable lens 200 (S46). On the other hand, if a completion notification for a previous diaphragm drive request has not been received, then the camera controller 140 waits until receiving a completion notification and thereafter notifies the interchangeable lens of a diaphragm drive request.

FIGS. 5A and 5B are diagrams describing diaphragm drive performed by the camera body 100 and an interchangeable lens when recording of a moving image is performed. FIG. 5A exemplifies control of a diaphragm when an interchangeable lens which is not suitable for recording of a moving image is attached to the camera body 100. FIG. 5B shows control of the diaphragm 260 when the interchangeable lens 200 according to the present embodiment which is suitable for recording of a moving image is attached to the camera body 100.

First, control of a diaphragm will be specifically described using FIG. 5A, when an interchangeable lens which is not suitable for recording of a moving image (that is, an interchangeable lens with "moving image support information=0" or a conventional interchangeable lens that does not have moving image support information) is attached to the camera body 100.

When the need to adjust a diaphragm 260 arises during recording of a moving image, the camera body 100 notifies the interchangeable lens of a drive request signal instructing the interchangeable lens to drive the diaphragm in synchronization with an exposure synchronizing signal (t4). In this example, it is assumed that the camera body 100 instructs the interchangeable lens to drive the diaphragm such that the aperture value changes from F8 to F2.8.

When the interchangeable lens obtains the drive request signal, the interchangeable lens starts drive of the diaphragm using F2.8 as a target value (t4). When the aperture of the diaphragm reaches a value that is determined by F2.8 which is the target value and a focal length and accordingly the F value reaches F2.8, the interchangeable lens notifies the camera body 100 of a completion notification indicating the completion of the diaphragm drive (t5).

Thereafter, when diaphragm drive is newly required, the camera body 100 newly notifies the interchangeable lens of a drive request signal again (t6). Here, the camera body 100 instructs the interchangeable lens to drive the diaphragm such that the aperture value of the diaphragm changes from F2.8 to F5.6. When the interchangeable lens obtains the drive request signal, the interchangeable lens starts drive of the diaphragm. When the drive of the diaphragm is completed, the interchangeable lens notifies the camera body 100 of a completion notification (t7).

As such, if an interchangeable lens is not suitable for recording of a moving image, i.e., when the moving image support information is "0" (or when moving image support information cannot be obtained), even when the need to change a diaphragm arises before obtaining a completion notification from the interchangeable lens, the camera body 100 according to the present embodiment does not newly notify the interchangeable lens of a drive request signal instructing the interchangeable lens to drive the diaphragm, until obtaining a completion notification from the interchangeable lens. For example, even when the need to change the aperture value to F5.6 arises before a completion notification indicating that the F value has reached F2.8 is received from the interchangeable lens, a new drive request signal is not notified before a completion notification is received but is notified at timing of an exposure synchronizing signal after a completion notification is received (t6).

Next, control of a diaphragm will be specifically described using FIG. 5B, when an interchangeable lens which is suitable for recording of a moving image (an interchangeable lens with "moving image support information=1") is attached to the camera body 100.

The interchangeable lens 200 according to the present embodiment is suitable for recording of a moving image. When an adjustment to the diaphragm 260 is required, the camera body 100 notifies the interchangeable lens 200 of a drive request signal instructing the interchangeable lens 200 to drive the diaphragm 260, in synchronization with an exposure synchronizing signal (t1). Here, the camera body 100 instructs the interchangeable lens 200 to drive the diaphragm 260 such that the aperture value of the diaphragm 260 changes from F8.0 to F2.8. When the interchangeable lens 200 obtains the drive request signal, the interchangeable lens 200 starts drive of the diaphragm 260 using F2.8 as a target value (t1).

When the interchangeable lens 200 attached to the camera body 100 is suitable for recording of a moving image, i.e., when the moving image support information 270 is "1", even before the camera body 100 obtains a completion notification from the interchangeable lens 200, when the need to change the diaphragm 260 arises, the camera body 100 newly notifies the interchangeable lens 200 of a drive request signal in accordance with timing of an exposure synchronizing signal. For example, when the need to change the aperture value to F5.6 arises before a completion notification indicating that the F value reaches F2.8 is received from the interchangeable lens 200, a new drive request signal is notified at timing of an exposure synchronizing signal (t2).

When the interchangeable lens 200 obtains the new drive request signal from the camera body 100, even before the aperture of the diaphragm 260 reaches a value that is determined by F2.8 which is the target value and a focal length, the interchangeable lens 200 starts drive of the diaphragm 260 such that the F value reaches the new target value (t2). For example, at time t2, the F value is "4.0" and thus the brightness of the interchangeable lens 200 has not reached F2.8 which is the target value instructed from the camera body 100 initially. However, the interchangeable lens 200 switches the drive of the diaphragm 20 from drive opening direction to drive in a closing direction, based on the target value "5.6" which is newly instructed from the camera body 100, and drives the diaphragm 260 such that the F value reaches "5.6". When the F value reaches 5.6, the interchangeable lens 200 notifies the camera body 100 of a completion notification (t3).

As such, when the interchangeable lens 200 that supports moving images newly accepts an instruction to drive the diaphragm 260 from the camera body 100 during the drive of the diaphragm 260, even when the drive of the diaphragm 260 is not completed, the interchangeable lens 200 performs drive control of the diaphragm 260 based on the new drive instruction.

1-5. Summary

The interchangeable lens 200 according to the present embodiment is suitable for recording of a moving image. That is, without waiting for completion of a change of the aperture of the diaphragm 260, the interchangeable lens 200 changes the aperture of the diaphragm 260 based on a new instruction from the camera body 100. Accordingly, a smooth moving image can be shot.

In addition, the interchangeable lens 200 according to the present embodiment has moving image support information 270. The camera body 100 obtains the moving image support information 270 in a recording preparation stage. Thus, the camera body 100 can recognize whether or not an interchangeable lens attached thereto is suitable for recording of a moving image. By this, for example, even if an interchangeable lens not suitable for recording of a moving image is attached to the camera body 100, the camera body 100 notifies the interchangeable lens of a drive request signal once which instructs the interchangeable lens to drive a diaphragm and thereafter does not newly notify the interchangeable lens of a drive request signal until obtaining a completion notification for the drive request signal from the interchangeable lens. By this, the following problems can be prevented.

When the camera body 100 notifies an interchangeable lens not suitable for recording of a moving image of a drive request signal once and thereafter notifies the interchangeable lens of a new drive request signal before obtaining a completion notification for the previous drive request signal, the camera body 100 falsely recognizes that the interchangeable lens is driven based on the newly notified drive request signal. On the other hand, the interchangeable lens that does not support moving images ignores the notification of the new drive request signal obtained before notifying a completion notification. Thus, in practice, the aperture value of the interchangeable lens is not a value notified by the drive request signal which is newly notified from the camera body 100 but is a value notified by the previous drive request signal which is notified immediately before the newly notified drive request signal. Hence, a problem occurs that, while the camera body side recognizes that the interchangeable lens is driven based on the new drive request signal, the interchangeable lens is driven based on the previous drive request signal which is notified immediately before the new drive request signal. However, in the present embodiment, the camera body 100 performs control based on moving image support information 270 such that a drive request signal is not newly notified until a completion notification is obtained from the interchangeable lens when an attached interchangeable lens is not suitable for recording of a moving image. Thus, a problem such as that described above can be prevented.

Note that, in the present embodiment, the moving image support information 270 (i.e., whether or not the interchangeable lens is suitable for recording of a moving image) is set only by whether or not the interchangeable lens 200 can control the drive of the diaphragm 260 based on a new instruction to drive the diaphragm 260 when the interchangeable lens 200 obtains the new instruction from the camera body 100 before completing the drive of the diaphragm 260. That is, a condition to determine that the interchangeable lens 200 supports moving images is that the interchangeable lens 200 can control the drive of the diaphragm 260 based on a new instruction without waiting for completion of the drive of the diaphragm 260 (continuous drive condition). However, the configuration does not necessarily need to be the one described above. For example, a condition (silent condition) as to whether or not the diaphragm 260 can be driven quietly at a predetermined level or less (i.e., the drive sound of the diaphragm 260 is at a predetermined level or less) may be added to the continuous drive condition. Specifically, when the interchangeable lens 200 obtains a new instruction to drive the diaphragm 260 from the camera body 100 before the drive of the diaphragm 260 is completed, only if the interchangeable lens 200 can control the drive of the diaphragm 260 based on the new instruction and can drive the diaphragm 260 at a drive sound of a predetermined level or less, it may be determined that the interchangeable lens 200 is suitable for recording of a moving image and thus "1" may be set to the moving image support information 270. For example, when the drive sound of the diaphragm 260 by the interchangeable lens 200 is higher than the predetermined level, the interchangeable lens 200 frequently drives the diaphragm 260, then drive sound thereof is recorded in the memory card 171 as moving image sound. Hence, in such a case, in order that drive sound is not recorded as much as possible, it is preferred not to frequently drive the diaphragm 260. Thus, as a condition for being moving image supportable (moving image support information=1), a condition as to whether or not the drive sound is at the predetermined level or less is added. By this, the camera body 100 can record a moving image where noise is relatively reduced. Furthermore, in addition to the continuous drive condition and the silent condition, a condition (stop accuracy condition) as to whether or not the stop accuracy of the diaphragm 260 is at a predetermined level or more may be added.

In the present embodiment, whether or not to notify an interchangeable lens of a drive request signal is switched according to obtained moving image support information 270. Specifically, by performing the processes at steps S43 and S44 before step S45, the camera controller 140 switches whether or not to generate a drive request signal, according to obtained moving image support information 270. That is, in the case in which a new target aperture value is calculated before the drive of a diaphragm is completed, when the moving image support information is "1", the camera controller 140 generates a drive request signal even before the drive of the diaphragm is completed; and when the moving image support information is "0", the camera controller 140 does not generate a drive request signal before the drive of the diaphragm is completed. However, the configuration does not necessarily need to be the one described above. The camera controller 140 should avoid, in any processing stage, an interchangeable lens that does not support moving images from receiving a new diaphragm drive request before the drive of a diaphragm for a previous diaphragm drive request is completed.

For example, the camera controller 140 may avoid an interchangeable lens that does not support moving images from receiving a new diaphragm drive request before the drive of a diaphragm for a previous diaphragm drive request is completed, by performing the processes at steps S43 and S44 between steps S45 and S46 to determine whether or not to send a new diaphragm drive request signal in the course of changing the diaphragm, according to the content of moving image support information 270.

In addition, for example, the camera controller 140 may switch whether or not to calculate a new target aperture value based on moving image support information 270 by performing the processes at steps S43 and S44 before step S41. Specifically, the configuration may be such that when the moving image support information is "1", the camera controller 140 calculates a new target aperture value even before the drive of a diaphragm is completed; on the other hand, when the moving image support information is "0", the camera controller 140 does not calculate a new target aperture value before the drive of the diaphragm is completed.

In addition, for example, the camera controller 140 may switch whether or not to make a determination as to whether or not to perform control to change the aperture of a diaphragm (i.e., a determination as to whether or not the aperture value needs to be changed) based on moving image support information 270 by performing the processes at steps S43 and S44 between steps S41 and S42. Specifically, the configuration may be such that when the moving image support information is "1", the camera controller 140 makes a determination as to whether or not to perform control to change the aperture of the diaphragm even before the drive of the diaphragm is completed. On the other hand, when the moving image support information is "0", the camera controller 140 does not make a determination as to whether or not to perform control to change the aperture of the diaphragm before the drive of the diaphragm is completed.

In the present embodiment, the operation of the camera system 1 for recording a moving image is described. However, it does not necessarily need to be the one described above. For example, during the operation of the camera system 1 for capturing a through image, the camera controller 140 may apply the same control as the disclosure provided in the present embodiment.

Although the description has been made in connection with specified embodiments thereof, many other modifications, corrections and applications are apparent to those skilled in the art. Therefore, the present embodiment is not limited by the disclosure provided herein. The present disclosure relates to subject matter contained in U.S. Patent Application No. 61/160,010, filed on Mar. 13, 2009 and Japanese Patent Application No. 2009-104996, filed on Apr. 23, 2009, which are expressly incorporated herein by reference in its entirety.

INDUSTRIAL APPLICABILITY

The present embodiment has an effect of being able to record smooth moving images, and is useful for an interchangeable lens attachable to a camera body and including a diaphragm that can be controlled by a camera body, and a camera body to which such an interchangeable lens is attachable.

What is claimed is:

1. An interchangeable lens that is mountable to a camera body and operates according to a command from the camera body, the interchangeable lens comprising:
   a diaphragm operable to regulate an amount of light from a subject by changing an aperture;
   a drive unit operable to change the aperture of the diaphragm; and
   a lens controller operable to control the drive unit to change the aperture of the diaphragm according to an instruction received from the camera body, wherein
   when the lens controller receives a new instruction from the camera body during an operation of changing the aperture of the diaphragm, the lens controller controls the drive unit to change the aperture of the diaphragm based on the new instruction without waiting for completion of the operation of changing the aperture according to a previous instruction.

2. The interchangeable lens according to claim 1, further comprising:
   a storage unit operable to store moving image support information that indicates whether or not the interchangeable lens is suitable for a moving image, wherein
   in a case in which the moving image support information stored in the storage unit indicates that the interchangeable lens is suitable for a moving image, when the lens controller receives the new instruction from the camera body during an operation of changing the aperture of the diaphragm, the lens controller controls the drive unit to change the aperture of the diaphragm based on the new instruction without waiting for completion of the operation of changing the aperture.

3. A camera body to which an interchangeable lens according to claim 2 is mountable, the camera body comprising:
   an imaging unit operable to generate image data;
   an aperture value obtaining unit operable to obtain an aperture value of the diaphragm from the interchangeable lens;
   a moving image support information obtaining unit operable to obtain, from the interchangeable lens, the moving image support information that indicates whether or not the interchangeable lens is suitable for the moving image; and
   a camera controller operable to control the camera body to change the aperture of the diaphragm, according to the image data generated by the imaging unit, the aperture value obtained by the aperture value obtaining unit, and the moving image support information obtained by the moving image support information obtaining unit.

4. The camera body according to claim 3, wherein
the camera controller includes a determination unit operable to determine whether or not to change the aperture of the diaphragm based on the image data generated by the imaging unit and the aperture value obtained by the aperture value obtaining unit, and
the camera controller switches, according to the obtained moving image support information, whether or not to perform the determination by the determination unit in a middle of changing the aperture of the diaphragm.

5. The camera body according to claim 3, wherein
the camera controller includes:
a determination unit operable to determine whether or not to change the aperture of the diaphragm based on the image data generated by the imaging unit and the aperture value obtained by the aperture value obtaining unit; and
a generator operable to generate a control signal for controlling the diaphragm based on a result of the determination performed by the determination unit, and
the camera controller switches, according to the obtained moving image support information, whether or not to generate the control signal by the generator in a middle of changing the aperture of the diaphragm.

6. The camera body according to claim 3, wherein
the camera controller includes:
a determination unit operable to determine whether or not to change the aperture of the diaphragm based on the image data generated by the imaging unit and the aperture value obtained by the aperture value obtaining unit;
a generator operable to generate a control signal for controlling the diaphragm based on a result of the determination performed by the determination unit; and
a body notification unit operable to send the control signal generated by the generator to the interchangeable lens, and
the camera controller switches, according to the obtained moving image support information, whether or not to send the control signal from the body notification unit in a middle of changing the aperture of the diaphragm.

* * * * *